United States Patent Office 3,455,676
Patented July 15, 1969

3,455,676
HERBICIDAL COMPOSITION AND METHOD EMPLOYING THIOALKYLTHIOBENZOTHIAZOLES
Kamal Naguib Ayad, Wrexham, Wales, assignor to Monsanto Chemicals Limited, London, England, a British company
No Drawing. Filed July 1, 1965, Ser. No. 468,950
Claims priority, application Great Britain, July 14, 1964, 28,925/64
Int. Cl. A01n 9/12, 7/00; C07d 91/48
U.S. Cl. 71—90                                    12 Claims

ABSTRACT OF THE DISCLOSURE

Thioalkylthiobenzothiazoles of the formula $$TS(CR_2)_n-SR'$$

where T 2-benzothiazolyl which may be substituted in the benzene ring, R is hydrogen or an aliphatic group, $n$ is 1 or a higher integer, and R' is aliphatic or aromatic. The compounds which can exist in tautomeric equilibrium with N-substituted benzothiazolinethiones are useful as herbicides and herbicidal compositions are described.

---

This invention relates to herbicidal compositions and to certain new chemical componds that can be uesd as the active ingredients for the compositions.

The use of chemicals to control or eradicate weeds while permitting the growth of plants of other species is well established. In some instances the action of the herbicidal chemical is such that it can be applied to a growing crop in which weeds are present, while in other instances the chemical is more effective as a "pre-emergent" herbicide, that is to say, it is applied to the ground immediately after the seed of the required crop has been sown. The economic importance of such methods is considerable, and much research effort is expended on the search for chemicals that are more effective, that have a different selective herbicidal action, or that are less expensive, than those available heretofore.

We have now found that certain new benzothiazole derivatives are very effective herbicides which in certain circumstances exhibit a selective activity.

The benzothiazole derivatives are new compounds having the formula:

I 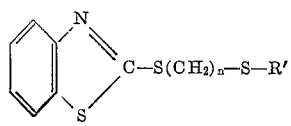

where R represents hydrogen or an aliphatic group, $n$ is 1 or a higher integer, R' represents an aliphatic or aromatic group, and where the benzene ring can optionally contain one or more substituents.

The invention includes a herbicidal composition containing a benzothiazole derivative as defined above in admixture with a carrier.

Also part of the invention is a method for inhibiting the growth of weeds by application to the weeds or to the ground in which the weeds are growing of one of the benzothiazole derivatives of the invention.

The benzothiazole derivatives are particularly useful as pre-emergent herbicides and when employed as such exhibit a selective toxicity towards grasses. A preferred method of use accordingly comprises the application of a benzothiazole derivative of the invention to ground containing seeds of weed grasses and in which a crop of a broad-leaf species of plant is to be grown, so that the growth of the weed grasses is inhibited.

The invention further includes a process for the production of a new benzothiazole derivative of the invention, in which a salt of a 2-mercaptobenzothiazole is reacted with a compound having the formula:

$$X-(CR_2)_n-S-R'$$

where X is a halogen atom and R, $n$, and R' have the same significance as before.

Benzothiazole derivatives of the above Formula I can exist in tautomeric equilibrium with N-substitted benzothiazolinethiones having the formla:

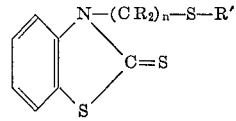

the proportion of the tautomers depending on such factors as whether the material is in the solid state or in solution, the temperature, and the precise nature of the grouping $-(CR_2)_n-S-R'$. Formula I as used herein to define the benzothiazole derivatives and the specific examples of these compounds given below are accordingly to be understood as covering the corresponding N-substituted benzothiazolinethiones and mixtures containing both forms.

Preferred benzothiazole derivatives are compounds where each R in Formula I above is hydrogen or an alkyl group (especially a lower alkyl group) and $n$ has the value 1 or 2. For instance the group $(CR_2)_n$ can be an alkylene group such as methylene or ethylene, or an alkylidene group, for instance an ethylidene, isopropylidene, 1-butylidene or 2-butylidene group. Particlarly preferred are componds where R' is an alkyl group, especially a lower alkyl group; that is to say, one containing not more than four carbon atoms, for example a methyl or ethyl group.

Where, in the more general class of compounds, $n$ is an integer higher than 2, it can, for example, have a value in the range 3 to 6, and in general its value does not exceed about 20.

In compounds where R' is an aliphatic group, this can be for example an alkyl group having either a straight or branched chain, for example a methyl, ethyl, isopropyl, s-butyl, n-hexyl, 2-ethylhexyl, dodecyl or octadecyl group; an alkenyl group, for example an allyl group; a cycloalkyl group, for example a cyclopentyl or cyclohexyl group; or an aralkyl group, for example a benzyl group.

Where R' is an aromatic group, this can be for example an aryl or substituted-aryl group, for instance a phenyl, alkylphenyl, alkoxyphenyl, halogenophenyl or nitrophenyl group.

Benzothiazole derivatives having one or more substituents in the benzene ring include compounds where such a substituent is an aliphatic or aromatic group (as exemplified above with reference to the group R'); a corresponding aliphatic-oxy or aromatic-oxy group; a halogen atom, for example chlorine or bromine; an amino group; or a nitro group. Of such derivatives, those having one or two substituents in the benzene ring are generally the most accessible.

Specific examples of the new benzothiazole derivatives are: 2(methylthiomethylthio)benzothiazole; 2(ethylthiomethylthio)benzothiazole; 2(methylthiomethylthio) - 6 - chlorobenzothiazole; 2(methylthiomethylthio) - 5-chlorobenzothiazole; 2(methylthiomethylthio) - 6 - ethoxybenzothiazole; 1(2' - benzothiazylthio)-2(methylthio)ethane; 1(2' - benzothiazylthio)-1-(ethylthio)ethane; 2(2'-benzothiazylthio) - 2(methylthio)butane; 2(cyclohexylthiomethylthio)benzothiazole; 2(benzylthiomethylthio) - 6-nitrobenzothiazole; 2(phenylthiomethylthio)benzothiazole; and 2(4' - methoxyphenylthiomethylthio)benzothiazole.

A herbicidal composition of the invention can be liquid or solid, and a liquid composition can be a solution, suspension, or emulsion. Often a surface-active agent is present to stabilize the composition or to facilitate its application.

A composition can contain a benzothiazole derivative as the only active ingredient, or one or more other compounds having similar properties can be present.

A solution of a benzothiazole derivative is one in an organic solvent, for example an alcohol; a ketone; a hydrocarbon, for instance white spirit, solvent naphtha or kerosene; or a halogenated hydrocarbon, for instance perchlorethylene. Where a solution contains a surface-active agent, this is selected according to its solubility in the solvent, and non-ionic surface-active agents, for example ethers or esters of polyethylene glycols, are generally suitable.

Compositions that are suspensions can be simple ones of the benzothiazole derivative in an aqueous medium, stabilized if necessary by the presence of a surface-active agent, for instance a non-ionic agent as exemplified above, or an ionic surface-active agent, for example a soap or a synthetic material such as for instance the sodium salt of a long-chain alkylated aromatic sulphonic acid.

A herbicidal emulsion of the invention is usually an aqueous emulsion, and can be obtained by emulsifying a solution of a benzothiazole derivative in a suitable organic solvent, generally one that is water-immiscible, with water in the presence of a surface-active agent. The surface-active agent can be ionic or non-ionic in character.

Compositions which are solids can for instance be those in which the diluent is an inert powder such as for instance kieselguhr or talc. Such a solid composition may also contain a surface-active agent to facilitate its application.

The proportion of the herbicide employed in the composition will, of coruse, vary according to the nature of the composition and the proposed application. In general, it is desirable to incorporate at least 1% by weight, but much larger amounts, for instance 10%, 25% or even 50% can be used, particularly if, as is frequently the case, the composition is a concentrated one intended to be diluted before use.

The active compound can be applied in a wide range of weights per acre of ground; for instance, from 1 lb. or rather less to 10 lbs. or more per acre.

In the process for the production of a new benzothiazole derivative, the 2-mercaptobenzothiazole salt usually employed is an alkali metal salt, for instance a sodium or potassium salt, although it can be, for example, an ammonium or amine salt, for instance a diethylamine salt.

The halogen atom X in the compound of formula:

$$X-(CR_2)_n-S-R'$$

can be for example chlorine, bromine, or iodine, and of these the first is generally preferred.

The process can be conducted simply by mixing the reactants at room temperature or somewhat above, for example at a temperature in the range from 20 to 50° C., although higher temperatures can be used if desired.

Preferably, since the 2-mercaptobenzothiazole salts are usually solid materials, the mixing is carried out in the presence of an inert liquid diluent to give a mobile reaction system. Such a diluent is preferably non-aqueous, and examples of suitable liquids are aliphatic and aromatic hydrocarbons, halohydrocarbons, and ethers.

An alternative method for the production of the new compounds comprises the reaction of a halogen-containing benzothiazole derivative having the formula:

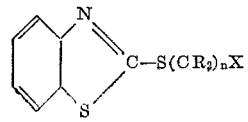

with a mercaptan (or the corresponding mercaptide) having the formula HS—R', where R, n, X, and R' have the same meanings as before.

A further method of the production of new benzothiazole derivatives where —(CR₂)ₙ— in the above formula of these compounds is a methylene group comprises the reaction of a 2-mercaptobenzothiazole with formaldehyde and a mercaptan of formula HS—R'.

The invention is illustrated by the following examples.

Example 1

This example describes the production of 2(methylthiomethylthio)benzothiazole.

9.7 grams (0.1 mole) of chloromethyl methyl sulphide was added during 10 minutes to a stirred mixture of 18.9 grams (0.1 mole) of sodium mercaptobenzothiazole, 100 cc. of benzene and 5.1 grams (0.05 mole) of triethylamine. The temperature rose during the addition from 19° to 40° C., and was then maintained at this higher temperature for a further 90 minutes. After cooling the mixture was filtered and the filtrate was distilled, first at atmospheric pressure to remove benzene, and then under reduced pressure. 13.7 grams of the required product were collected as a fraction having a boiling range of 130°–140° C. at a pressure of 0.05 mm. of mercury. On cooling, the fraction solidified to material having a melting point of 50°–53° C. (Found: C, 47.1; H, 4.0; N, 6.2; S, 42.1. $C_9H_9S_3$ requires C, 47.7; H, 4.0; N, 6.2; S, 42.3%.)

Spectroscopic examination of the product showed that it consisted of 2(methylthiomethylthio)benzothiazole, containing 5% of 3(methylthiomethyl)benzothiazoline-2-thione.

Example 2

This example illustrates the herbicidal action of the product described in Example 1.

In the test used to assess the effectiveness of the material as a pre-emergent herbicide, seeds of several species of grasses, including rye grass, wild oat, brome grass, sorghum, foxtail, barnyard and crab grass, and of several species of broad-leaved plants, including radish, sugar beet, cotton, and tomato were sown in green-house boxes. After sowing, the surface of the soil in the boxes was sprayed with an aqueous dispersion of the material to be tested at a rate equivalent to 5 pounds of the active compound per acre. Observations on normal or abnormal seedling growth or seedling failure were subsequently carried out.

On the results of this test, the material was rated as moderately toxic to grasses generally, with severe toxicity to rye grass, foxtail, barnyard and crab grass, and sorghum, and as having no toxic action on broad-leaved species.

It is intended to cover all changes and modifications of the examples of the invention herein chosen for purposes of disclosure which do not constitute departures from the spirit and scope of the invention.

What is claimed is:

1. A herbicidal composition containing a major proportion of a herbicidal adjuvant as carrier and a minor phytotoxic proportion of a compound having the formula:

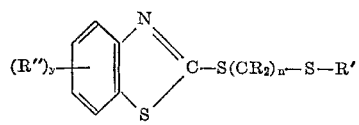

where each R independently is selected from a group consisting of hydrogen and lower alkyl; n is an integer at least 1 but not more than 2; R' is lower alkyl; R" is selected from the group consisting of R', R'O, chlorine, bromine, amino, and nitro; and y is an integer from zero to 2, inclusive.

2. A herbicidal composition containing a major proportion of a herbicidal adjuvant as carrier and a minor phytotoxic proportion of a compound having the formula:

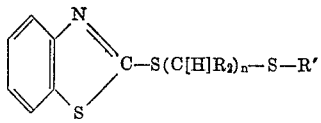

where $n$ is an integer at least one but not more than 2, R is hydrogen or lower alkyl, and R' is lower alkyl.

3. A herbicidal composition containing a major proportion of a herbicidal adjuvant as carrier and a minor phytotoxic proportion of a compound having the formula:

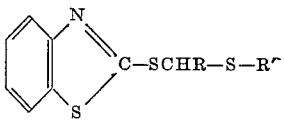

where R and R' are lower alkyl.

4. A herbicidal composition containing a major proportion of a herbicidal adjuvant as carrier and a minor phytotoxic proportion of 2(methylthiomethylthio)benzothiazole.

5. A herbicidal composition according to claim 1 that also contains a surface-active agent.

6. A herbicidal composition according to claim 4 that also contains a surface-active agent.

7. A method for inhibiting the growth of weeds by application to the ground in which the weeds are growing of a benzothiazole derivative having the formula:

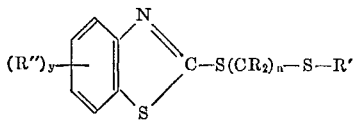

where each R independently is selected from a group consisting of hydrogen and lower alkyl; $n$ is an integer at least 1 but not more than 2; R' is lower alkyl; R'' is selected from the group consisting of R', R'O, chlorine, bromine, amino, and nitro, and $y$ is an integer from zero to 2, inclusive.

8. A method for inhibiting the growth of weeds by application to the ground in which the weeds are growing of a benzothiazole derivative having the formula:

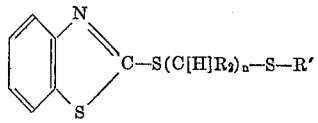

where $n$ is an integer at least one but not more than 2, R is hydrogen or lower alkyl, and R' is lower alkyl.

9. A method for inhibiting the growth of weeds by application to the ground in which the weeds are growing of a benzothiazole derivative having the formula:

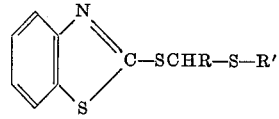

where R and R' are lower alkyl.

10. A method for inhibiting the growth of weeds by application to the ground in which the weed is growing of 2(methylthiomethylthio)benzothiazole.

11. A method according to claim 7, which comprises the application of the benzothiazole derivative to ground containing seeds of weed grasses, and in which ground a crop of a broad-leaf species of plant is to be grown.

12. A method according to claim 10, which comprises the application of the benzothiazole derivative to ground containing seeds of weed grasses, and in which ground a crop of a broad-leaf species of plant is to be grown.

References Cited

UNITED STATES PATENTS

| | | | |
|---|---|---|---|
| 2,081,766 | 5/1937 | Reppe et al. | 260—306 |
| 2,352,078 | 6/1944 | Coleman et al. | 260—306 |
| 2,653,865 | 9/1953 | Kosmin et al. | 71—90 |
| 2,693,408 | 11/1954 | D'Amico | 71—90 |

FOREIGN PATENTS 360,491  11/1931  Great Britain.

JAMES O. THOMAS, Jr., Primary Examiner

U.S. Cl. X.R.

260—306, 306.6

PO-1050
(5/69)

UNITED STATES PATENT OFFICE
CERTIFICATE OF CORRECTION

Patent No. 3,455,676      Dated July 15, 1969

Inventor(s) Kamal Naguib Ayad

It is certified that error appears in the above-identified patent and that said Letters Patent are hereby corrected as shown below:

Column 1, line 50, in the formula ($CH_2$) should read ($CR_2$).

SIGNED AND
SEALED

SEP 30 1969

(SEAL)
Attest:

Edward M. Fletcher, Jr.
Attesting Officer

WILLIAM E. SCHUYLER, JR.
Commissioner of Patents